United States Patent
Toub

(10) Patent No.: US 11,579,855 B2
(45) Date of Patent: Feb. 14, 2023

(54) REDUCED MEMORY CONSUMPTION OF COMPILER-TRANSFORMED ASYNCHRONOUS METHODS

(71) Applicant: MICROSOFT TECHNOLOGY LICENSING, LLC., Redmond, WA (US)

(72) Inventor: Stephen Harris Toub, Winchester, MA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 405 days.

(21) Appl. No.: 15/844,480

(22) Filed: Dec. 15, 2017

(65) Prior Publication Data
US 2019/0187965 A1   Jun. 20, 2019

(51) Int. Cl.
*G06F 9/455* (2018.01)
*G06F 8/41* (2018.01)

(52) U.S. Cl.
CPC ............ *G06F 8/458* (2013.01); *G06F 8/4441* (2013.01); *G06F 9/45516* (2013.01)

(58) Field of Classification Search
CPC ...................................................... G06F 8/458
See application file for complete search history.

(56) References Cited

U.S. PATENT DOCUMENTS

| | | | | |
|---|---|---|---|---|
| 6,044,305 A | * | 3/2000 | Larson | G05B 19/4184 700/11 |
| 6,157,955 A | * | 12/2000 | Narad | H04L 45/16 709/228 |
| 8,707,194 B1 | * | 4/2014 | Jenkins | H04L 67/025 715/772 |
| 8,898,404 B2 | * | 11/2014 | Obata | G06F 12/0253 711/159 |
| 2002/0087744 A1 | * | 7/2002 | Kitchin | G06F 8/20 719/331 |
| 2004/0267967 A1 | * | 12/2004 | Sarangam | H04L 69/10 709/250 |
| 2007/0245028 A1 | * | 10/2007 | Baxter | H04L 29/06027 709/228 |

(Continued)

FOREIGN PATENT DOCUMENTS

WO   WO-2005089337 A2 *  9/2005  ............. G06F 9/465

OTHER PUBLICATIONS https://softwareengineering.stackexchange.com/questions/113177/why-do-languages-such-as-c-and-c-not-have-garbage-collection-while-java-does? (Year: 2012).*

(Continued)

*Primary Examiner* — Lewis A Bullock, Jr.
*Assistant Examiner* — Mohammad H Kabir

(57) ABSTRACT

An asynchronous method is implemented in a manner that reduces the amount of runtime overhead needed to execute the asynchronous method. The data elements needed to suspend an asynchronous method to await completion of an asynchronous operation, to resume the asynchronous method at a resumption point, and to provide a completion status of the caller of the asynchronous method are consolidated into one or two reusable objects. An asynchronous method may be associated with a distinct object pool of reusable objects. The size of a pool and the total size of all pools can be configured statically or dynamically based on runtime conditions.

20 Claims, 5 Drawing Sheets

(56) References Cited

U.S. PATENT DOCUMENTS

| | | | | |
|---|---|---|---|---|
| 2010/0070586 | A1* | 3/2010 | Lawrence | G06F 9/546 |
| | | | | 709/206 |
| 2011/0265070 | A1* | 10/2011 | Meijer | G06F 8/314 |
| | | | | 717/159 |
| 2012/0324431 | A1* | 12/2012 | Toub | G06F 8/456 |
| | | | | 717/159 |
| 2013/0047255 | A1* | 2/2013 | Dalcher | H04L 63/20 |
| | | | | 726/23 |
| 2015/0254330 | A1* | 9/2015 | Chan | G06F 17/30598 |
| | | | | 707/613 |
| 2015/0269111 | A1* | 9/2015 | Bak | G06F 13/1663 |
| | | | | 711/151 |
| 2017/0371703 | A1* | 12/2017 | Wagner | G06F 9/485 |
| 2018/0027071 | A1* | 1/2018 | Toepke | H04L 67/1095 |
| | | | | 709/217 |
| 2018/0137199 | A1* | 5/2018 | Miller | H04L 63/08 |
| 2018/0203790 | A1* | 7/2018 | Carey | G06F 11/3664 |
| 2018/0285083 | A1* | 10/2018 | Bonorden | G06F 9/485 |

OTHER PUBLICATIONS

Toub, Stephen, "Reduce allocations when async methods yield". Retrieved From: <<https://github.com/dotnet/coreclr/pull/13105>>, Sep. 22, 2017, 24 Pages.

* cited by examiner

REDUCED MEMORY CONSUMPTION OF COMPILER-TRANSFORMED ASYNCHRONOUS METHODS

BACKGROUND

Asynchronous programming provides runtime support for a program to execute an asynchronous method independently from a main task. In this manner, the main task does not have to wait for a long running operation to complete and is able to perform other processing. In order to facilitate the independent execution of an asynchronous method, a considerable amount of overhead is incurred.

The state of the asynchronous method is saved in order to suspend its execution until the asynchronous operations whose results the asynchronous method awaits completes. The state of the asynchronous method is saved to resume its execution at a resumption point when an awaited asynchronous operation completes. The state data is typically stored in numerous dynamically-allocated objects on a heap which incurs a cost for the dynamic allocation and a cost for a garbage collection process to reclaim the objects when the state data is no longer used by the program. This overhead, at times, may be considerable thereby adversely impacting the responsiveness and performance of an application employing the asynchronous operation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Asynchronous programming support is provided to facilitate the execution of an asynchronous method by consolidating the data elements (e.g., a state machine, task object, execution context, and action delegate) needed to suspend and restore execution of an asynchronous method and return a completion status, into one or two reusable objects thereby minimizing the overhead incurred by the runtime to support the asynchronous method. The runtime minimizes the number of dynamic object allocations made, eliminates boxing the state machine onto a heap, avoids interface calls to resume execution of the asynchronous method, and eliminates a garbage collection process to reclaim unused objects.

Each asynchronous method may have its own pool of reusable objects. When an asynchronous method suspends execution for the first time, it takes an object from its pool if one is available or allocates a new one. When the asynchronous operation completes, the object is returned to the pool. The size of each pool may be determined statically or dynamically based on runtime conditions.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
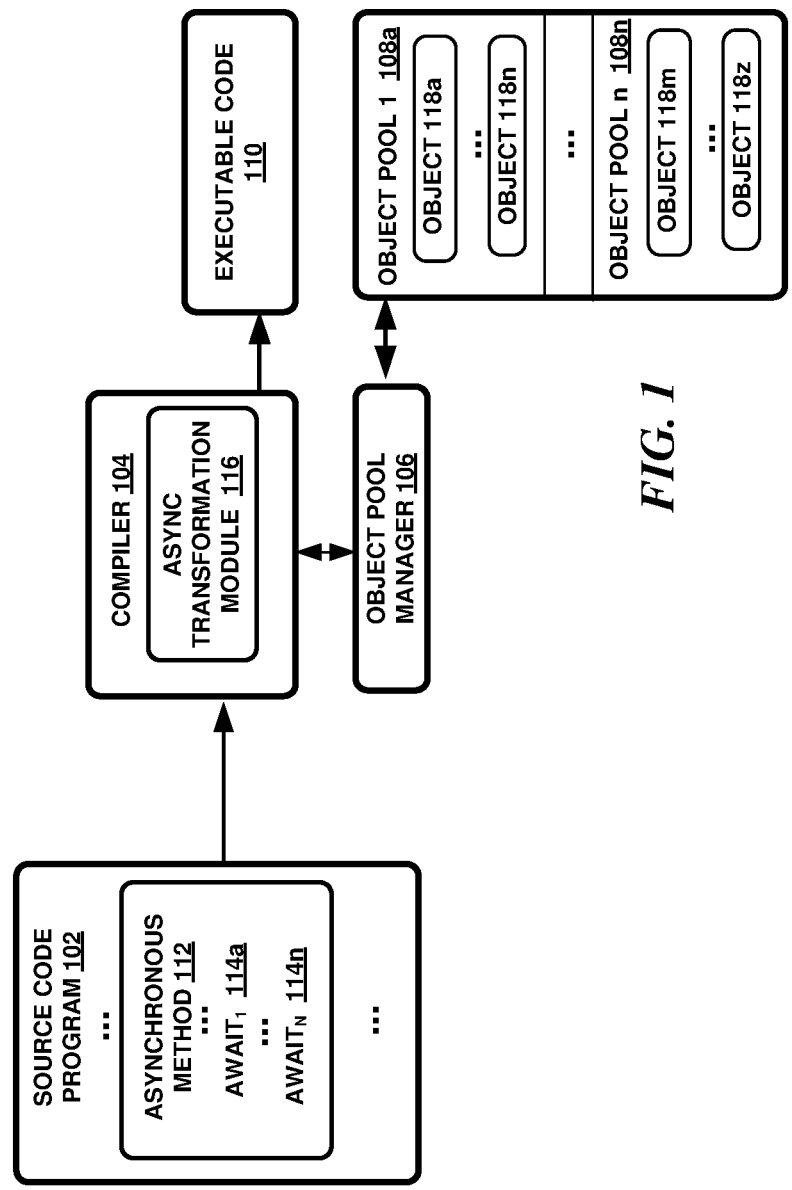
FIG. 1 illustrates an exemplary system that facilitates reduced-memory consumption of compiler-transformed asynchronous methods.

The subject matter disclosed pertains to techniques that reduce the amount of runtime support needed to facilitate an asynchronous method. An asynchronous method is a method that may be suspended in order to await completion of zero or more asynchronous operations and which resumes execution upon completion of an awaited asynchronous operation. The caller of the asynchronous method is not blocked awaiting completion of the asynchronous method and instead is notified when the asynchronous method finishes. The data needed to suspend and resume execution of the asynchronous method and provide a completion status to the caller of the asynchronous method are consolidated and stored in one or two reusable objects.

In one aspect, an asynchronous method may include an await statement that identifies an asynchronous operation that needs to be completed before the asynchronous method can resume processing. A compiler transforms the asynchronous method into a sequence of instructions that saves the current execution state of the asynchronous method in order to suspend the asynchronous method. In addition, instructions are generated to resume processing from the point at which the asynchronous operation is invoked, and to yield control back to the caller of the asynchronous method. This process involves the use of several data elements (e.g., structures and objects) which can be dynamically-allocated at runtime from heap storage thereby incurring significant overhead in time and resource consumption. These data elements are consolidated into one or two objects in order to avoid this overhead. A pool of reusable objects is utilized to temporarily store the objects thereby reducing the number of runtime allocations needed to facilitate the asynchronous operation.

The techniques disclosed herein are described with respect to the implementation of an asynchronous method in the programming languages supported by the .NET framework (e.g., C#, F #, Visual Basic). The .NET framework is a code execution environment that supports object-oriented programming through a set of tools that enables the development and execution of software programs running in a Windows-based operating system. However, it should be understood that the subject matter disclosed is not limited to this particular implementation and that the disclosed techniques are applicable to other implementations of asynchronous and/or parallel programming environments.

In one aspect, asynchronous programming is supported by the use of async\await keywords which are used to identify an asynchronous method (async) and an asynchronous operation (await). An asynchronous operation is identified by an await expression or operation (e.g., await t) that marks a point at which the asynchronous method cannot proceed until the asynchronous operation is completed. In the meantime, the asynchronous method is suspended and control returns to the caller of the asynchronous method. The compiler has to keep track of what must happen when control returns to a resumption point in the suspended asynchronous method and the state that is needed upon its resumption. As such, the compiler generates instructions that store data elements used to continue the asynchronous method from where the asynchronous method was suspended. These data elements include a task object, a state machine structure, an execution context object, and an action delegate object.

A task is an object that represents a unit of work, such as a method, and returns the results or a promise when the unit of work is completed. The promise or future represents the result that will be available in the future. In the case of an asynchronous method, the task is immediately returned to the caller of the asynchronous method thereby allowing the caller to continue processing without having to wait for completion of the asynchronous method. At some point the asynchronous method will complete and the task object will be marked as completed or failed.

A state machine structure is used to model the control flow of the asynchronous method. The state machine structure stores the state of the asynchronous method which includes, at least, the local variables and parameters of the asynchronous method, the code of the asynchronous method, and methods that facilitate transitions between the asynchronous method and the asynchronous operation. The state machine structure includes a MoveNext method that advances the state of the asynchronous method to a resumption or continuation point after the await expression completes.

In one aspect, the state machine is defined as a structure whose size and configuration is defined at compilation time and which is stored on the stack. The state machine is configured in this manner since not all asynchronous methods operate asynchronously. There are times when a method is defined as an asynchronous method but operates synchronously thereby requiring its state to be stored in the stack.

An execution context object is a container that stores all the information relevant to a logical thread of execution, such as without limitation a security context (e.g., permissions to access a secured resource), a call context (i.e., enables out-of-band data to be passed without explicitly passing the information as a parameter or return object), and a synchronization context (i.e., allows one thread to communicate with another thread).

In a synchronous method, the thread that executes a method keeps ambient data in the thread's local storage. When multiple methods are called, the ambient data flows between each of the multiple methods in the same thread. However, in an asynchronous method, different sections of the asynchronous method can be executed in different threads making the local storage of the ambient data unusable by all threads. To overcome this issue, the execution context keeps the ambient data for a single logical flow that spans multiple threads.

An action or continuation delegate is a reference to a method that calls back into the asynchronous method (via its MoveNext method) at the resumption point in the correct execution context. When the await expression refers to a task, or other object the runtime has implicit knowledge of, the action delegate can be made part of the consolidated reusable object so that the MoveNext method is invoked directly. In the case where the await expression is based on an operand of a custom type rather than the task type, the runtime obtains an action delegate to the MoveNext method for the awaited operation to invoke when it completes.

Instead of dynamically allocating objects for each instance of each data element, these data elements can be consolidated into one or, at most, two objects. The objects can be reusable objects from a pool of previously allocated objects. In order to understand how this technique operates, attention now turns to a description of the type system in the .NET framework.

A data type in a programming language is a classification of data that indicates how the data is to be used in a program. Traditional data types include integer, Boolean, characters, floating point values, and so forth. In the .NET framework, all data types are further classified as either a value type or a reference type. This further classification identifies how the data is stored in memory. A value type is stored in an area in memory referred to as a stack or can be stored in other objects that are on the heap. A value type does not have its own object rather it is a value that is stored either on the stack or part of another object in the heap. A reference type is stored in an area of memory referred to as a heap.

A value type contains a value so there is no separate heap allocation for value type data and as such, there is no runtime overhead for dynamically allocating the data and garbage collection overhead for reclaiming the unused data. A value type represents numeric types (e.g., integer, Boolean, floating point, character, decimal), structures and enumerations. A structure is defined by the use of the struct keyword.

A reference type contains a pointer or address of a location in heap storage that holds the data. Reference types are classes, objects, arrays, delegates, interfaces, etc. Reference type data is generated at runtime when an instance of the data is explicitly created, such as when a variable is declared using the new operator or when it is assigned to an object that has been created using the new operator. When an instantiation of the reference type data or object is created, memory is allocated on the heap and the data or object is stored in the heap.

Reference type data is stored on a heap. The reference type data is allocated at runtime and as such, a garbage collection process is used to reclaim the unused reference type data. Garbage collection is an automatic memory management process that reclaims garbage or memory allocated to objects that are no longer used by a program.

The data structures or objects used to suspend and resume the asynchronous method are typically stored in a garbage-collected heap. However, the state machine is a structure or value type that needs to be boxed onto the heap. The state machine is configured as a structure since an asynchronous method may complete synchronously. Since it is not known whether the asynchronous method will run synchronously or asynchronously, the state machine is configured as a value type to account for both cases.

Boxing is the process of converting a value type to an object type by wrapping the structure inside a runtime-generated object that is stored on the heap. Boxing is a computationally expensive operation that involves dynamically-allocating a new object and constructing it with the wrapper. In order to avoid boxing the state machine structure, the state machine structure is configured as a type that is stored on a field of a type derived from the task. In this manner, the state machine structure is added to the task object thereby avoiding boxing the state machine structure onto the heap.

The elimination of boxing the state machine structure has additional benefits. The state machine includes a MoveNext method that advances the asynchronous method to the resumption point. When the state machine structure is boxed, a call is made to an interface to invoke the MoveNext method. By using a strongly-typed field on the derived class, the MoveNext method can be invoked directly thereby avoiding the interface call. In this manner, the MoveNext method can be inlined which optimizes the executable code for faster execution. The interface call is a slower operation since an interface call involves a level of indirection that increases the execution time of the application and which cannot be optimized as easily.

Another benefit of configuring the state machine structure as a type that is stored on a field of a type derived from the task is the reduced costs associated with allocating an object. Every object has some additional state/size associated with it beyond the size required to store the actual data for that object. By consolidating the state machine into another object (e.g., task), we avoid that extra size overhead. For example, in a 64-bit process, every object in the .NET framework has 16 bytes of overhead, so for a class that contains a single Int64 value, which is 8 bytes, that object will be 24 bytes large rather than 8 bytes large. By storing that Int64 value into an existing object rather than allocating a separate one for it, the costs associated with allocating and cleaning up the separate object is saved as well as a reduction of the total amount of space allocated by 16 bytes.

Furthermore, when the state machine structure is boxed onto the heap, it is subject to garbage collection. In some situations, an asynchronous method may be written by a developer in a manner where the asynchronous method never completes and the state machine object is then reclaimed by the garbage collector. A debugger will not have any information to assist the developer to understand any problems. This is due in part because the runtime assumes all control of the object on the heap when the runtime boxes the state machine. In the configuration where the state machine is stored on a Task-derived type, a developer can derive another type from the original Task-derived type, such as a debugging type, that adds specific data or functionality into this subtype in order to support debugging the state machine. The debugging type can have a special method (e.g., finalizer or destructor) that can check whether the state machine was finished by the time the object was garbage collected and fire an event, raise a warning, and/or trigger a breakpoint when this occurs.

The performance of an application using an asynchronous method may suffer from the excessive use of the dynamic allocations on a garbage-collected heap. An object pool of reusable objects is utilized to temporarily store the data structures needed to facilitate the asynchronous operation. In one aspect, the object pool or pool includes a number of reusable objects where a single object is used to temporarily store the consolidated task object, state machine structure, execution context, and the action delegate. In this manner, the number of allocations for each asynchronous method is reduced from four allocations to one or two allocations at most.

Attention now turns to a more detailed description of the techniques, methods, and systems that facilitate the asynchronous operation using reusable objects.

Reduced-Overhead Asynchronous Programming Support

FIG. 1 illustrates a block diagram of an exemplary system 100 for facilitating an asynchronous method with reduced memory consumption. The system 100 includes a source code program 102, a compiler 104, an object pool manager 106, a collection of object pools 108a-108n and executable code 110. The source code program 102 may be written in any programming language that supports asynchronous methods. The source code program 102 has at least one asynchronous method 112 having one or more await expressions 114a-114n. An asynchronous method may be configured to await execution of one or more asynchronous operations identified in an await expression.

The compiler 104 transforms the source code program 102 into executable code 110. The executable code 110 can be managed code that is compiled to execute under a runtime environment or native code that is compiled to execute on a specific processor. In the case of the .NET framework, a program is compiled into an intermediate representation in a platform-neutral language referred to as the Common Intermediate Language (CIL) and is provided to a Common Language Runtime (CLR) that compiles the intermediate representation at runtime into processor-specific machine or executable code 110. In other managed environments or implementations, the intermediate representation is executed using an interpreter or with a combination of the interpreter and the runtime environment.

In one aspect, the compiler 104 is a language compiler. A language compiler operates on the source code of a program written in a particular programming language. The language compiler parses the source code in accordance with the grammar of the underlying programming language. The language compiler can generate the executable code, either native or managed code (i.e., intermediate representation, bytecodes, etc.). The language compiler, using an asynchronous transformation module 116, converts the asynchronous method written in a sequential flow construct into an asynchronous implementation.

Attention now turns to an example that illustrates this code transformation. The following is an example of an asynchronous method in C#.

```
static async Task DoWorkAsync( )
{
var r = await t;
}
```

The method is DoWorkAsync( ) of type Task and the keyword async identifies the DoWorkAsync( ) method as being an asynchronous method that has an asynchronous operation. It should be noted that even though the async keyword is used in the declaration of the method DoWorkAsyc( ), there is no requirement that an asynchronous method must contain an await expression. In the situation where an asynchronous method does not contain an asynchronous operation, the asynchronous method executes synchronously with normal sequential flow. The await expression, await t, indicates that DoWorkAsync( ) is to await the completion of the operation referenced by the expression t before resuming execution.

The asynchronous transformation module 116 translates the await operation into a sequence of instructions that facilitates the asynchronous operation. For example, the asynchronous transformation module 116 can transform the await expression, await t, into the following exemplary pseudo code:

```
(1)    var $awaiter = t.GetAwaiter( );
(2)    if(!awaiter.IsCompleted)
(3)    {
(4)        _state = 42;
(5)        _builder.AwaitOnCompleted(ref $awaiter, ref this);
(6)        return;
(7)    }
(8)    Label42:
(9)    var r= $awaiter.GetResult( );
```

The method t.GetAwaiter( ) gets the awaiter from the object t. The variable $awaiter is set to the task object for the awaiter or the asynchronous method. The statement if(!awaiter.IsCompleted) checks if the asynchronous operation has already completed. In the case where the asynchronous operation has completed, the process skips down to Label42: which is at the statement var r=$awaiter.GetResult( ). The statement var r=$awaiter.GetResult( ) obtains the completion status of the awaiter which is set to the variable r which is returned back to the asynchronous method that invoked the await operation. The GetResult( ) method on the awaiter for the type returned from the asynchronous method returns the reusable object back to the object pool.

In the case where the awaiter has not completed, lines (4)-(6) are executed. The source code statement _state=42 stores the location of the resumption point where the method continues to once the asynchronous operation completes. Line 5 is a call to the builder method, _builder.AwaitOnCompleted, with the parameters awaiter and this. This builder method hooks up a callback to the awaiter to continue execution from the location associated with _state when the asynchronous operation completes. In addition, if this is the first time a suspension is occurring in this method invocation, then the builder method either obtains an object from the object pool or allocates one to store the data elements needed to facilitate the transition back to the asynchronous method at the resumption point.

Referring back to FIG. 1, the exemplary system includes several object pools 108a-108n (collectively, 108) where each object pool 108a-108n contains reusable or previously-allocated objects 118a-118z. Each object pool 108a-108n is associated with a particular asynchronous method. The object pools 108 are located in heap storage. The portion of heap storage allotted to the object pools 108 is managed by an object pool manager 106. The object pool manager 106 manages the objects in an object pool 108. The object pool manager 106 services requests for an object 118 and requests to release an object 118 back to the object pool 108. In one aspect, the object pool manager 106 is part of the runtime execution environment. The object pool 108 does not utilize a garbage collection process for the reclamation of unused objects.

The asynchronous method obtains an object from the object pool 108 the first time the asynchronous method needs to be suspended to await completion of an asynchronous operation. In one aspect, there is an object pool for each method since each method has its own state machine type and thus its own version of the type derived from a task. In another aspect, an object pool can be used for multiple methods.

The object pool manager 106 manages each object pool 108 in accordance with one or more policies. A policy can dictate the number of objects in each pool, the cumulative number of objects for all object pools within a program, whether the object pool can grow dynamically based on an observed memory usage, and so forth. Based on the policy, the object pool manager 106 controls the size of an object pool 108.

The basic policy for each object pool 108 is that an object pool 108 starts out empty and when an asynchronous method suspends execution for the first time and needs an object, the method takes one from the object pool 108 or if none is available allocates a new one. When the asynchronous operation completes and the task is awaited, the pooled object is returned to the object pool 108 so that it may be used by other invocations of the same asynchronous method.

A policy can be changed statically or vary dynamically based on monitoring the behavior of the program at runtime. Each object pool 108 can be controlled independently since each object pool 108 is associated with a particular asynchronous method. For example, there could be a limit on the number of objects in one asynchronous method's object pool due to the size of the state machine object which holds a lot of local variables. There could be no limit on another object pool's size where the state machine object holds less local variables.

In one aspect, the asynchronous transformation module 116 can generate instructions to store the necessary data elements into a reusable object from the object pool 108. The following exemplary pseudo-code illustrates the builder method from the preceding example which utilizes reusable objects from an object pool:

```
(1)   public void AwaitOnCompleted <TAwaiter, TStateMachine> (
(2)       ref TAwaiter awaiter, ref TStateMachine stateMachine)
(3)       where TAwaiter : ICriticalNotifyCompletion
(4)       where TStateMachine : IAsyncStateMachine
(5)   {
(6)       AsyncStateMachineBox<TStateMachine> b = _task;
(7)       If (b == null)
(8)       {
(9)           b = new AsyncStateMachineBoxPool<TStateMachine>.Get( );
(10)          if (b==null)
(11)          {
(12)              b = new AsyncStateMachineBox <TStateMachine>( );
(13)          }
(14)          _task = b;
(15)              b.StateMachine = stateMachine;
(16)      }
(17)      b.Context = ExecutionContext.Capture( );
(18)      if (awaiter is TaskAwaiter ta)
(19)      {
(20)          ta.Task.OnCompletedInternal(b);
(21)      }
(22)      else
(23)      {
(24)          Action a = box.GetOrAllocateMoveNextAction( );
(25)          Awaiter. OnCompleted(a);
(26)      }
```

Lines (1)-(4) define the method signature of the method AwaitOnCompleted( ). Line 1 defines the type parameters of this method as TAwaiter and TStateMachine. Line 2 defines the parameters of the method. Lines (3)-(4) indicate that the type of the awaiter parameter must implement the ICriticalNotifyCompletion interface and that the type of stateMachine parameter must implement the IAsyncStateMachine interface. This allows the method to be called with any type for those parameters as long as those types satisfy these constraints.

The statement in line 5, AsyncStateMachineBox<TStateMachine>b=_task, obtains the task object associated with the current invocation of the asynchronous method. If none exists, then this is the first await expression that has not completed. As noted above, the asynchronous transformation module 116 generates instructions to save the data elements at the first await expression that has not completed. A task object would have been allocated if there was a previous await expression that caused the asynchronous method to suspend. In the case where there are no task objects in the object pool (line 7: If (b==null)), a new object is created in line 12, b=new AsyncStateMachineBox<TStateMachine>( ).

The variable, _task, is set to reference the task object in line 14. In line 15, the state machine structure, stateMachine, is moved into the task object b in line 15, b.StateMachine=stateMachine. In line 17, the execution context is captured and stored in the task object as well, b.Context=Execution Context. Capture( ).

The source code statements, in lines 18-21, check if the action of the awaiter is a task. In cases where the await operation pertains to an expression other than a task or what is not recognizable by the runtime, an action delegate is dynamically allocated on the heap once per state machine object. The action delegate is stored into the state machine object and subsequent awaits can use it rather than allocating another one.

It should be noted that the pseudo code enclosed herein is for illustration purposes and should not be construed as limiting the subject matter to a particular implementation. It should also be noted that when the transformed instructions are executed on a processor, these instructions implement a method that performs the actions of the transformed instructions.

In addition, although the system 100 shown in FIG. 1 has a limited number of elements in a certain configuration, it should be appreciated that the system 100 can include more or less elements in alternate configurations. The embodiments are not limited in this manner. For example, the system 100 may include an Integrated Development Environment (IDE) (e.g., Microsoft's Visual Studio®, NetBeans, Eclipse, SharpDevelop, Lazarus, etc.) which provides a set of software development tools, such as compilers, source code editors, profilers, debuggers, linkers, binders, etc. that facilitate the generation of the execute code with asynchronous programming support.

Attention now turns to a description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
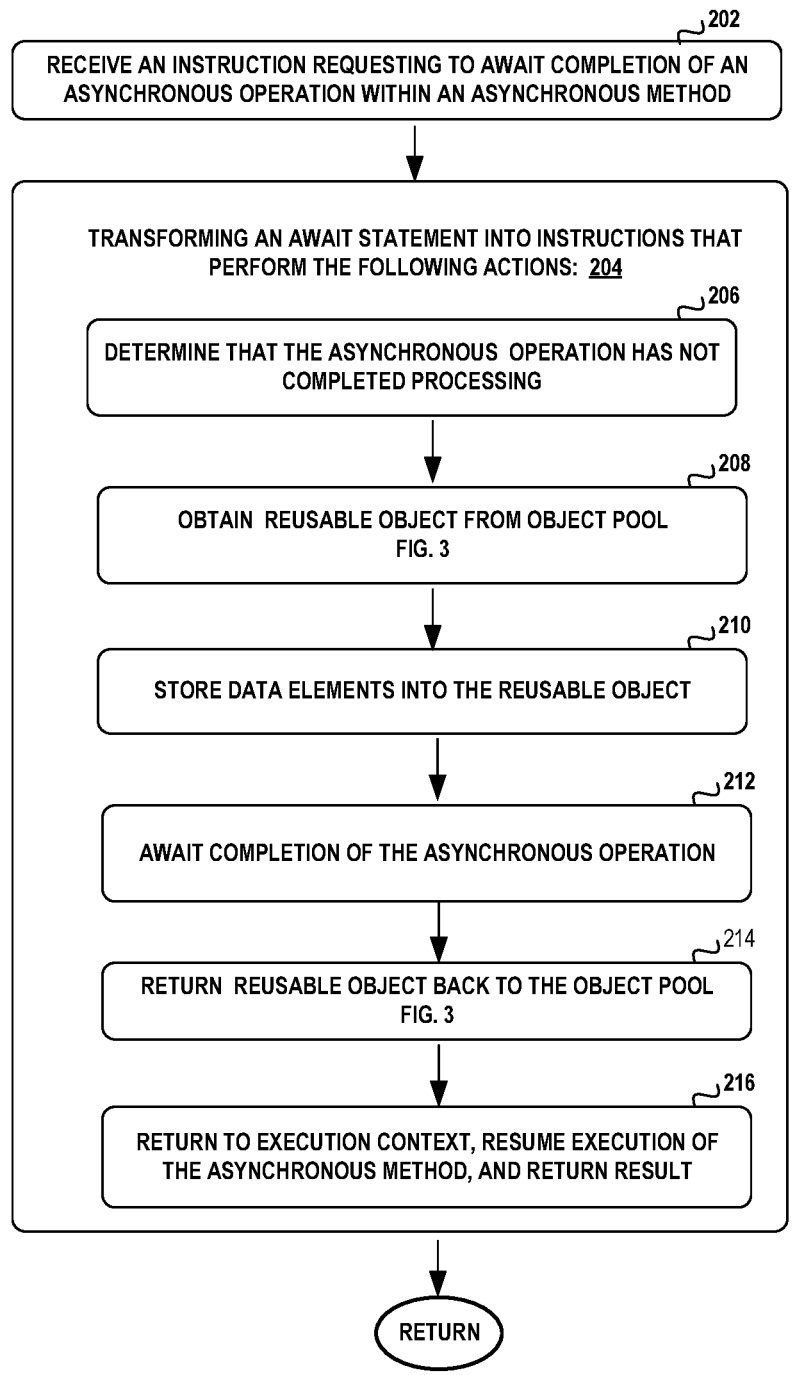
FIG. 2 is a flow diagram illustrating an exemplary method for transforming source code having an asynchronous method into instructions that execute the asynchronous method with reduced-memory consumption.

Turning to FIG. 2, there is shown an exemplary method 200. A compiler parses the source code statements in a program and recognizes an await expression requesting to await completion of an asynchronous operation (block 202). The compiler transforms the await expression into instructions that facilitate execution of the asynchronous operation (block 204). The compiler, through the asynchronous transformation module, generates instructions that perform the actions shown in blocks 206-216 when executed on a processor.

Initially, the method determines whether or not the asynchronous operation has already completed (block 206). If the asynchronous operation has completed, the flow of control proceeds synchronously with a normal serial execution of the instructions in the asynchronous method. If the asynchronous operation is not completed, then the method proceeds with obtaining a reusable object from the object pool (block 208).

Figure 3:
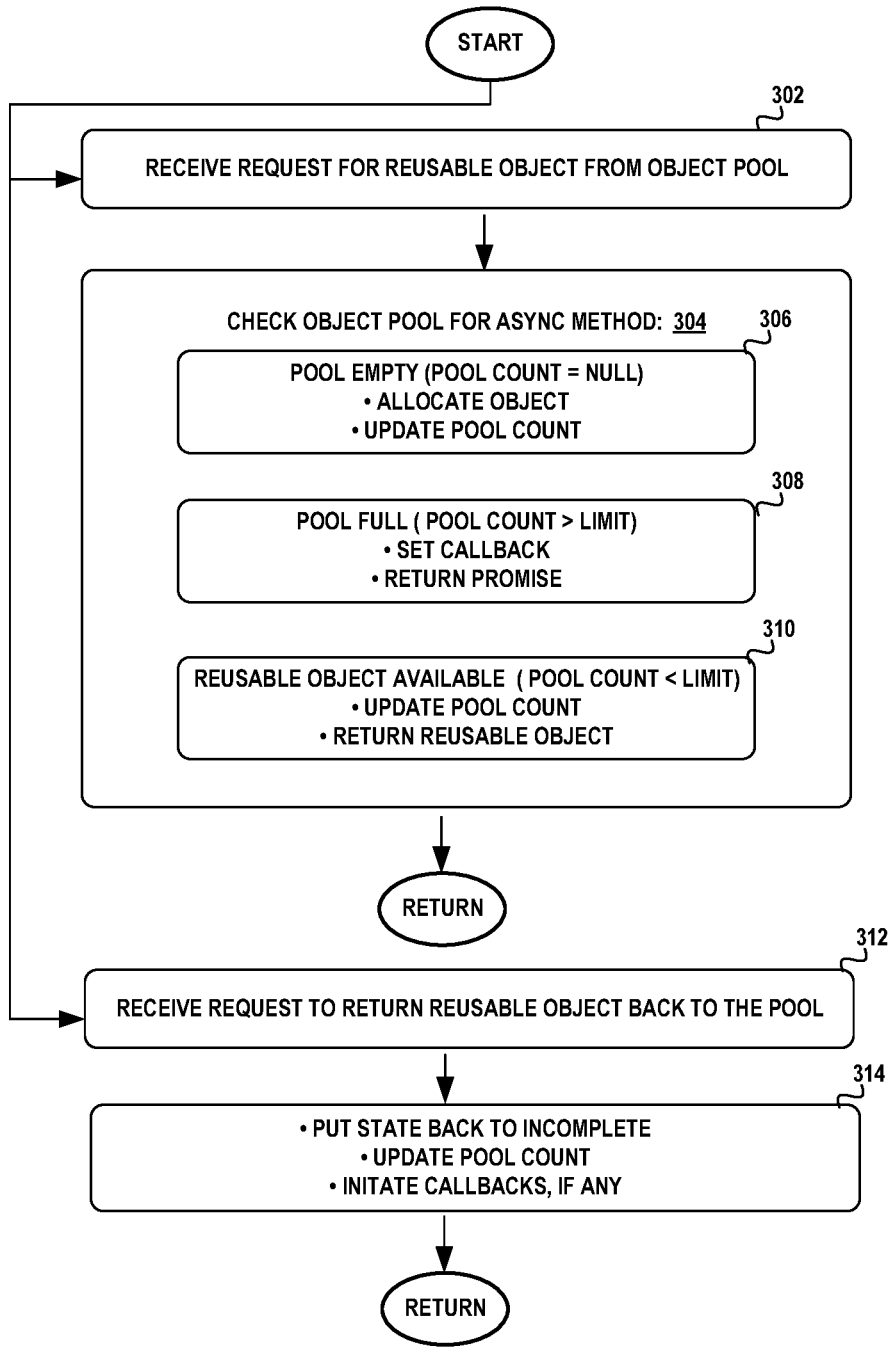
FIG. 3 is a flow diagram illustrating an exemplary method for servicing requests to obtain a reusable object and to return a reusable object back to the object pool.

Turning to FIG. 3, the object pool manager may receive a request for a reusable object from the object pool (block 302) or a request to return a reusable object back to the pool (312). The object pool manager can utilize a pool count that indicates the number of objects in a pool. In the case where the request is for a reusable object from the object pool (block 302), the object pool manager checks the object pool for a particular asynchronous method (block 304).

If the object pool is empty (pool count=null), then a reusable object can be allocated and the pool count updated (block 306). If the pool is full (pool count>limit), then a callback to the requesting method can be configured and a promise object is returned to the requesting thread (block 308). A callback is a method that gets called when another method completes. In this manner, the requesting method is notified when a reusable object is available. If a reusable object is available (pool count<limit), then the pool count is updated and the reusable object is removed from the object pool (block 310).

Returning back to FIG. 2, the method then stores the data elements onto the task object (block 210). The state machine structure is added to the task object and the execution context is captured and stored onto the task object as well (block 210). When the asynchronous operation pertains to a task, then the state machine object serves as the continuation object that moves the asynchronous method to the resumption point (block 210). Otherwise, an action delegate is allocated which references the MoveNext method of the state machine (block 210).

Upon completion of the asynchronous operation (block 212), the task object is returned to the object pool (block 214). Turning to FIG. 3, the object pool manager receives a request to return an object back to the pool (block 312). The object pool manager sets the completion status of the object back to incomplete, updates the pool count, and any callbacks to a thread awaiting an object is made to notify the availability of the object (block 314).

Referring back to FIG. 2, the execution context is restored and execution of the asynchronous method resumes at the resumption point through invocation of the MoveNext method (block 216). When the asynchronous method finishes processing, a task is returned to the caller of the asynchronous method that indicates a completion status (block 216).

Technical Effect

Aspects of the subject matter disclosed herein pertain to the technical problem of providing efficient runtime support for facilitating an asynchronous method. The technical features associated with addressing this problem is the consolidation of the data elements needed to resume execution of an asynchronous method and to notify the caller of the asynchronous method with a completion status into at most two reusable objects. In this manner, the runtime support can suspend and resume execution of the asynchronous method at a resumption point in a manner that reduces the number of dynamic object allocations made, eliminates boxing the state machine onto a heap, avoids interface calls to resume execution of the asynchronous method, and eliminates a garbage collection process to reclaim unused objects.

Exemplary Operating Environments

Figure 4:
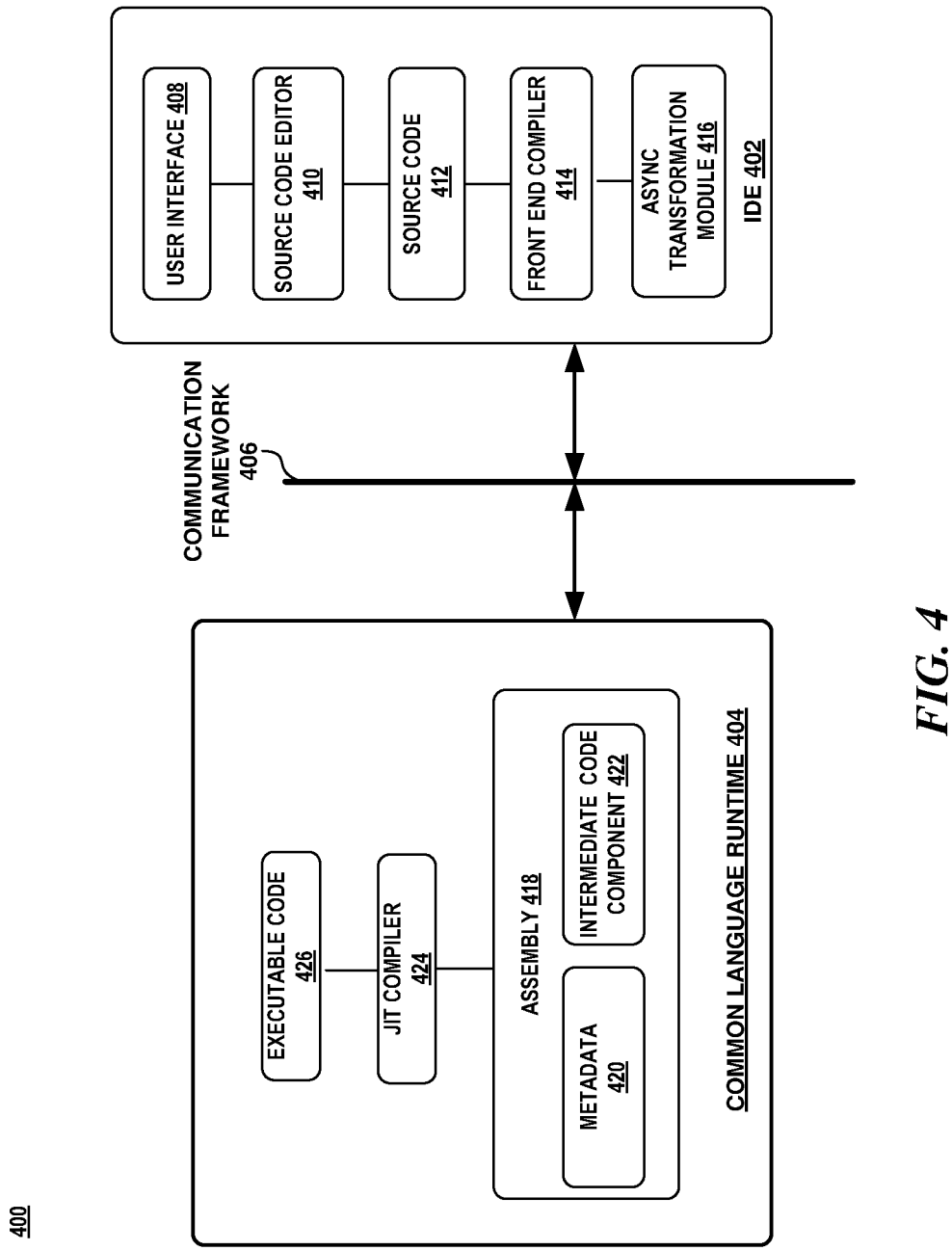
FIG. 4 is a block diagram illustrating a first operating environment.

Attention now turns to a discussion of exemplary operating environments. FIG. 4 illustrates an exemplary operating environment 400 that includes an integrated development environment (IDE) 402 and a Common Language Runtime Environment 404 communicatively coupled via a communication framework 406. The IDE 402 may allow a user (e.g., developer, programmer, designer, coder, etc.) to design, code, compile, test, run, edit, debug or build a program, set of programs, web sites, web applications, and web services in a computer system. Software programs can include source code 412, created in one or more source code languages (e.g., Visual Basic, Visual J #, C++. C#, J #, Java Script, APL, COBOL, Pascal, Eiffel, Haskell, ML, Oberon, Perl, Python, Scheme, Smalltalk and the like). The IDE 402 may provide a native code development environment or may provide a managed code development that runs on a virtual machine or may provide a combination thereof. The IDE 402 may provide a managed code development environment using the .NET framework.

A user can create and/or edit the source code 412 according to known software programming techniques and the specific logical and syntactical rules associated with a particular source language via a user interface 408 and a source code editor 410 in the IDE 402. Thereafter, the source code 412 can be compiled via a front end or language compiler 414. During this compilation process, the front end compiler 414 uses an async transformation module 416 to generate instructions that provides runtime support for the execution of an asynchronous method. The front end compiler 414 generates an intermediate language representation of the source code 412, such as assembly 418. The assembly 418 may comprise the intermediate language component 422 and metadata 420.

An intermediate language (IL) component 422 may be created from the source code component 412 and the front end compiler 414 and the executable code (e.g., machine executable instructions) is created from the intermediate language component 422 using a just-in-time (JIT) compiler 424, when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

Figure 5:
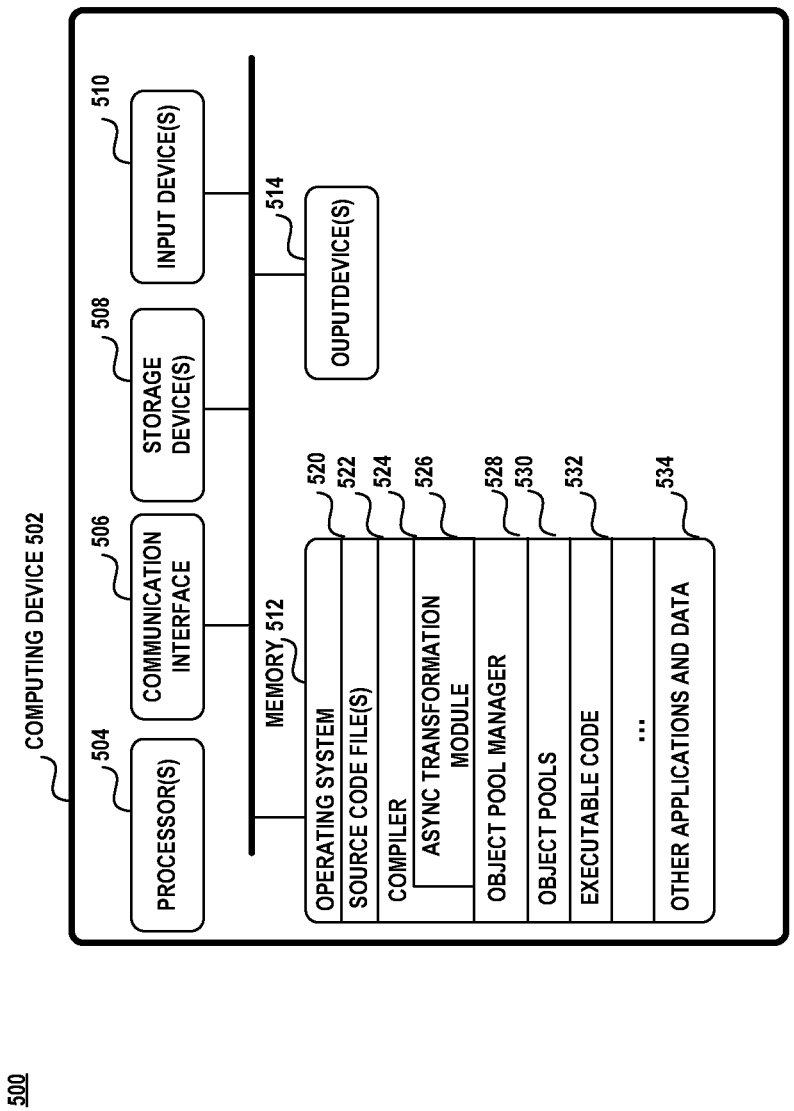
FIG. 5 is a block diagram illustrating a second operating environment.

Turning to FIG. 5, the aspects may be applied to a second operating environment 500 utilizing at least one computing device 502. The computing device 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 500 may be configured in a network environment, a distributed environment, a multi-processor environment, or a stand-alone computing device having access to remote or local storage devices.

The computing device 502 may include one or more processors 504, a communication interface 506, one or more storage devices 508, one or more input devices 510, one or more output devices 514, and a memory 512. A processor 504 may be any commercially available or customized processor and may include dual microprocessors and multi-processor architectures. The communication interface 506 facilitates wired or wireless communications between the computing device 502 and other devices. A storage device 508 may be computer-readable medium that does not contain propagating signals, such as modulated data signals transmitted through a carrier wave. Examples of a storage device 508 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 508 in the computing device 502. The input devices 510 may include a keyboard, mouse, pen, voice input device, touch input device, etc., and any combination thereof. The output devices 514 may include a display, speakers, printers, etc., and any combination thereof.

The memory 512 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 512 may also include one or more external storage devices or remotely located storage devices that do not pertain to propagated signals, such as modulated data signals transmitted through a carrier wave.

The memory 512 may contain instructions, components, and data. A component is a software program that performs a specific function and is otherwise known as a module, program, and/or application. The memory 512 may include an operating system 520, one or more source code files 522, a compiler 524 having an async transformation module 526, an object pool manager 528, one or more object pools 530, executable code 532 and other applications and data 534.

A system is disclosed having at least one processor and a memory. The system includes a program having at least one asynchronous method where the asynchronous method is configured to suspend execution in order to await completion of at least one asynchronous operation. The system includes at least one object pool associated with the asynchronous method and the object pool includes one or more reusable objects. The system includes executable instructions that when executed on the at least one processor consolidates state data needed to resume execution of a suspended asynchronous method at a resumption point upon completion of an asynchronous operation, store the state data in a select reusable object from an object pool associated with the asynchronous method, and suspend execution of the asynchronous method to await completion of the asynchronous operation. The executable instructions perform further actions that resume execution of the asynchronous method from the resumption point, returns the select reusable object back to the object pool, consolidates the state data into a reusable object the first time the asynchronous method awaits completion of an asynchronous operation, sets a cumulative limit to the number of reusable objects in all the object pools used in the program, sets a size of an object pool based on previous executions of the program, and dynamically alters a size of an object pool based on runtime conditions of the program such as the memory usage of the program.

A method is disclosed that is implemented on a computing device having at least one processor and a memory where the method suspends execution of an asynchronous method in order to await completion of an asynchronous operation. The method obtains a reusable object from an object pool where the reusable object was previously allocated at runtime, consolidates state data needed to resume execution of the asynchronous method into the reusable object, and releases execution control back to a caller of the asynchronous method.

Upon completion of the asynchronous operation, the method restores the state data from the reusable object, releases the reusable object back to the object pool, and resumes execution of the method at the resumption point. An asynchronous method may have its own object pool. In the event, the object pool does not have an available object, an object is allocated or the method awaits until a reusable object becomes available. A limit can be set of the number of reusable objects in the object pool based on runtime conditions and the number of reusable objects in an object pool can be dynamically increased based on current runtime conditions A computing device is disclosed that includes at least one processor communicatively coupled to a memory. The at least one processor is configured to maintain one or more objects in an object pool that is situated in a non-garbage-collected heap. At least one reusable object is associated with an asynchronous method where an asynchronous method is configured to suspend execution to await completion of an asynchronous operation. Upon suspension of the asynchronous method to await completion of the first asynchronous operation, the state data needed to resume execution of the suspended asynchronous method is consolidated into one reusable object. Upon resumption of the asynchronous method, the state data is restored, the reusable object is released back to the object pool, and the asynchronous method is resumed at a resumption point. The processor is configured to: set a limit on a number of objects in all the object pools used in the program; dynamically increase a number of reusable objects in the object pool base on runtime conditions; set a limit of a number of reusable objects in the object pool based on previous executions of the program; allocate a reusable object when none is available; and when no reusable objects are available, configure a callback to provide a notification when a reusable object becomes available.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor and a memory;
   a program including an asynchronous method, the asynchronous method having an await expression that identifies an asynchronous operation, wherein the asynchronous method is configured to suspend execution in order to await completion of the asynchronous operation;
   an object pool dedicated to the asynchronous method, the object pool including one or more reusable objects, wherein a reusable object has been previously allocated and stores state data needed to suspend and resume execution of a specific invocation of the asynchronous method, the object pool situated in a non-garbage-collected heap; and
   a compiler that transforms the await expression into executable code including instructions that when executed on the at least one processor performs actions that:
      consolidate the state data needed to suspend and resume execution of the asynchronous method at a resumption point upon completion of an asynchronous operation;
      store the state data in a select one of the one or more reusable objects from the object pool of the asynchronous method; and
      suspend execution of the asynchronous method to await completion of the asynchronous operation.

2. The system of claim 1, wherein the executable code includes further instructions that when executed on the at least one processor performs actions that:
   resume execution of the asynchronous method from the resumption point; and
   return the select reusable object to the object pool.

3. The system of claim 1, wherein the state data includes a state machine structure, an execution context object, a task object, and an action delegate object.

4. The system of claim 1, wherein the executable code includes further instructions that when executed on the at least one processor performs actions that:
   perform the consolidation of the state data when the asynchronous method awaits completion of an asynchronous operation a first time.

5. The system of claim 1, further comprising an object pool manager that sets a cumulative limit to a number of reusable objects in all object pools used in the program.

6. The system of claim 1, further comprising an object pool manager that sets a size of the object pool based on previous executions of the program.

7. The system of claim 1, further comprising an object pool manager that dynamically alters a size of the object pool based on memory usage during execution of the program.

8. A method implemented on a computing device having at least one processor and a memory, the method comprising:
   obtaining a reusable object from an object pool, the object pool dedicated to an asynchronous method, the reusable object previously allocated at runtime from a non-garbage-collected heap portion of the memory, wherein a reusable object stores state data needed to suspend and resume execution of a specific invocation of the asynchronous method;
   consolidating state data needed to suspend and resume execution of an asynchronous method into the reusable object, the asynchronous method including an await expression that identifies an asynchronous operation, the asynchronous method configured to be suspended to await completion of the asynchronous operation;
   suspending execution of the asynchronous method until completion of the asynchronous operation; and
   releasing execution control back to a caller of the asynchronous method.

9. The method of claim 8, further comprising:
   upon completion of the asynchronous operation:
      restoring the state data from the reusable object;
      releasing the reusable object back to the object pool; and
      resuming execution of the asynchronous method at the resumption point.

10. The method of claim 8, wherein the state data includes a state machine structure, an execution context object, a task object, and an action delegate object.

11. The method of claim 8, wherein obtaining a reusable object from the object pool further comprises:
   in the event the object pool does not have an available reusable object, allocating a reusable object.

12. The method of claim 8, wherein obtaining a reusable object from the object pool further comprises:

in the event the object pool does not have an available reusable object, awaiting return of an available reusable object.

13. The method of claim 8, wherein obtaining a reusable object from the object pool further comprises:
setting a limit of a number of reusable objects in the object pool based on previous executions of the program.

14. The method of claim 8, wherein obtaining a reusable object from the object pool further comprises:
dynamically increasing a number of reusable objects in the object pool based on current runtime conditions.

15. A computing device, comprising:
at least one processor communicatively coupled to a memory; and wherein the at least one processor is configured to:
maintain one or more reusable objects in an object pool, the object pool dedicated to an asynchronous method of a program, the asynchronous method including an await expression identifying an asynchronous operation, wherein a reusable object has been previously allocated and stores state data needed to suspend and resume execution of a specific invocation of the asynchronous method, the object pool situated in a non-garbage-collected heap;
determine that the asynchronous method needs to be suspended to await completion of the asynchronous operation;
consolidate state data needed to suspend and resume execution of the asynchronous method upon completion of the asynchronous operation into a select one of the one or more reusable objects;
suspend execution of the asynchronous method and return execution control back to a caller of the asynchronous method; and
upon completion of the asynchronous operation, restore the state data at the resumption point, release the select reusable object back to the object pool, and resume execution of the asynchronous method at the resumption point.

16. The computing device of claim 15, wherein the at least one processor is further configured to:
set a limit on a number of reusable objects in all object pools used in the program.

17. The computing device of claim 15, wherein the at least one processor is further configured to:
dynamically increase a number of reusable objects in the object pool based on runtime conditions.

18. The computing device of claim 15, wherein the at least one processor is configured to:
set a limit of a number of reusable objects in the object pool based on one or more previous executions of the program.

19. The computing device of claim 15, wherein the at least one processor is configured to:
in the event the object pool does not have a reusable object readily available, configure a callback to provide a notification when a reusable object is available.

20. The computing device of claim 15, wherein the at least one processor is configured to:
in the event the object pool does not have a readily available reusable object, allocate a reusable object.

* * * * *